(12) United States Patent
Anderson et al.

(10) Patent No.: US 8,533,398 B2
(45) Date of Patent: Sep. 10, 2013

(54) COMBINATION BASED LRU CACHING

(75) Inventors: Jeffrey Anderson, West Fargo, ND (US); David Lannoye, Fargo, ND (US)

(73) Assignee: Microsoft Corporation, Redmond, WA (US)

( * ) Notice: Subject to any disclaimer, the term of this patent is extended or adjusted under 35 U.S.C. 154(b) by 291 days.

(21) Appl. No.: 12/942,249

(22) Filed: Nov. 9, 2010

(65) Prior Publication Data
US 2012/0117329 A1    May 10, 2012

(51) Int. Cl.
*G06F 12/00*    (2006.01)

(52) U.S. Cl.
USPC .......................................................... 711/136

(58) Field of Classification Search
None
See application file for complete search history.

(56) References Cited

U.S. PATENT DOCUMENTS

| | | | |
|---|---|---|---|
| 5,765,191 A | 6/1998 | Loper et al. | |
| 6,148,376 A * | 11/2000 | Claassen | 711/132 |
| 6,408,364 B1 * | 6/2002 | Tan et al. | 711/136 |
| 6,449,695 B1 | 9/2002 | Bereznyi et al. | |
| 6,823,427 B1 | 11/2004 | Sander et al. | |
| 7,747,823 B2 | 6/2010 | Schmidt et al. | |
| 2009/0172315 A1 | 7/2009 | Iyer et al. | |

FOREIGN PATENT DOCUMENTS

EP    1035477 A3    9/2000

OTHER PUBLICATIONS

Markatos, Evangelos P. "On Caching Search Engine Query Results", Retrieved at <<http://www.ics.forth.gr/dcs/Activities/papers/2000.WCW.caching_search.pdf>>, In Proceedings of the 5th International Web Caching and Content DeliveryWorkshop, May 2000, pp. 14.

Agnes, Brian, "A High Performance Multi-Threaded LRU Cache", Retreived at <<http://www.codeproject.com/KB/recipes/LRUCache.aspx>>, Feb. 3, 2008, pp. 6.

Ali, et al., "Integration of Least Recently Used Algorithm and Neuro-Fuzzy System into Client-side Web Caching", Retrieved at<<http://www.cscjournals.org/csc/manuscript/Journals/IJCSS/volume3/Issue1/IJCSS-52.pdf>>, International Journal of Computer Science and Security (IJCSS), vol. 3, Issue (1), 2009, pp. 15.

* cited by examiner

*Primary Examiner* — Hiep Nguyen
(74) *Attorney, Agent, or Firm* — Turk IP Law, LLC

(57) ABSTRACT

Combination based LRU caching employs a mapping mechanism in an LRU cache separate from a set of LRU caches for storing the values used in the combinations. The mapping mechanism is used to track the valid combinations of the values in the LRU caches storing the values resulting in any given value being stored at most once. Through the addition of a byte pointer significantly more combinations may be tracked in the same amount of cache memory with full LRU semantics on both the values and combinations.

17 Claims, 6 Drawing Sheets

COMBINATION BASED LRU CACHING

BACKGROUND

Caching in general is when some extra data is tracked in local memory to avoid having to recalculate it (if calculation is resource-expensive) or to avoid having to re-fetch it (if the cost of a fetch operation is resource-expensive). A special case of caching involves processors, where cache memory is typically used by the central processing unit of a computing device to reduce the average time to access the main memory. The cache is commonly a smaller, faster memory, which stores copies of the data from the most frequently used main memory locations. As long as most memory accesses are cached memory locations, the average latency of memory accesses tend to be closer to the cache latency rather than to the latency of main memory.

When an application needs data, it first checks whether a copy of that data is in the cache. If so, the application may immediately reads from or writes to the cache, which is significantly faster and less resource-expensive than reading from or writing to a remote data store. Cache is, however, typically smaller in size. Thus, capacity pressures on cache are greater than those on remote data stores. One category of the many approaches for efficient use of cache memory is Least Recently Used (LRU) replacement. Generally, unused or least recently used content in cache is deleted in favor of new data according to LRU replacement approaches. Different management methods may be used for different types of cache. Caches implementing LRU replacement approaches may be referred to as LRU caches.

Standard LRU caches are commonly implemented using a simple doubly-linked list, which drops the least recently used items out of cache when memory pressures exist. This scheme breaks down when the values being cached are combinations of values. For example, a combination of ten values in six segments represents one million potential combinations. Storing even ten thousand of those combinations may require sixty thousand times the size of a single value in storage, with the vast majority of the stored values being repeated thousands of times each.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to combination based LRU caching employing a mapping mechanism in an LRU cache separate from a set of LRU caches for storing the values used in the combinations. The mapping mechanism may be used to track the valid combinations of the values in the LRU caches storing the values resulting in any given value being stored at most once. According to some embodiments, through the addition of a byte pointer significantly more combinations may be tracked in the same amount of cache memory with full LRU semantics on both the values and combinations.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
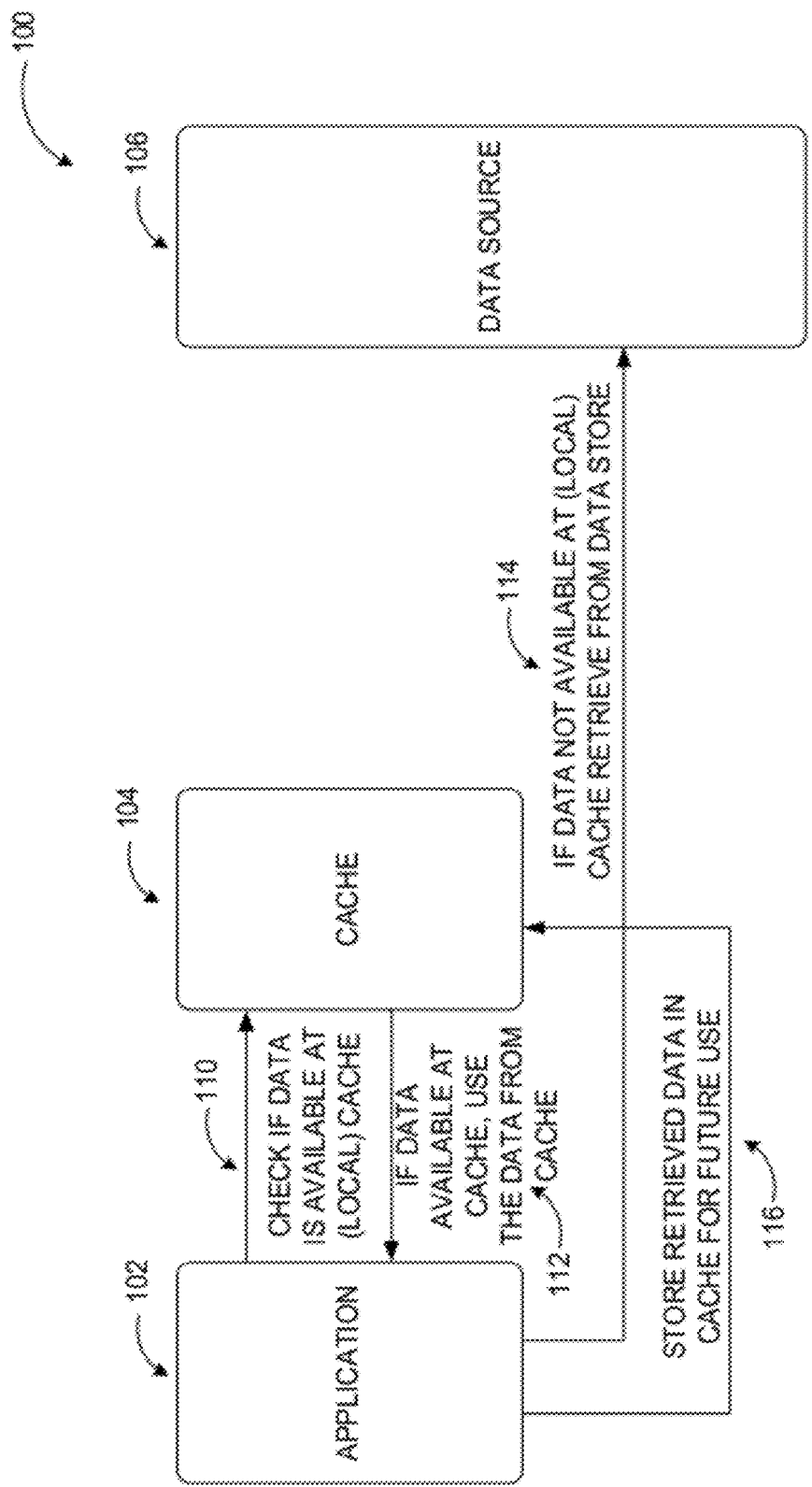
FIG. 1 illustrates an example cache use environment.

As briefly described above, a mapping mechanism in an LRU cache separate from a set of LRU caches for storing the values used in the combinations may be used to track the valid combinations of the values in the LRU caches storing the values resulting in any given value being stored at most once. According to some embodiments, a type of "byte" may be chosen as the value pointer to allow a combination (defined as a set of these pointers) to take less space overall. With the use of a byte pointer significantly more combinations may be tracked in the same amount of cache memory with full LRU semantics on both the values and combinations. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable storage media.

Throughout this specification, the term "platform" may be a combination of software and hardware components for enterprise resource planning operations. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Referring to FIG. 1, an example cache use environment is illustrated in diagram 100. An application 102 executed on a computing device may retrieve and write data from/to two different types of data sources, among others. Data store 106 may typically store larger amounts of information and may slower and more resource-expensive (e.g. network connections to a remote data store) to access than cache 104, which may be smaller in size, but faster and less resource-expensive to access. Each data store type may have an index, which may be a unique number used to identify locations in those data stores. Each location in the cache 104 may have a tag that contains the index of the data in data store 106 that has been cached.

When the application 102 needs data for one or more operations, it may check to see if the data is available at cache 104 (110). If the data is available at cache 104, it may be retrieved from the cache and used by the application 102 (112). If the data is not available, on the other hand, application 102 may retrieve the data from data store 106 (114) and use it. Application 102 may also store the retrieved data at cache 104 for future use (116).

In a system according to embodiments, a mapping mechanism in an LRU cache separate from a set of LRU caches for storing the values used in the combinations may be employed to track the valid combinations of the values in the LRU caches storing the values and result in any given value being stored at most once. By adding a byte pointer, significantly more combinations may be tracked in the same amount of cache memory with full LRU semantics on both the values and combinations. Thus, lists of combination may be stored in a condensed format while still applying LRU semantics to that condensed format with efficient performance. Moreover, data may be maintained optimally in these caches.

Figure 2:
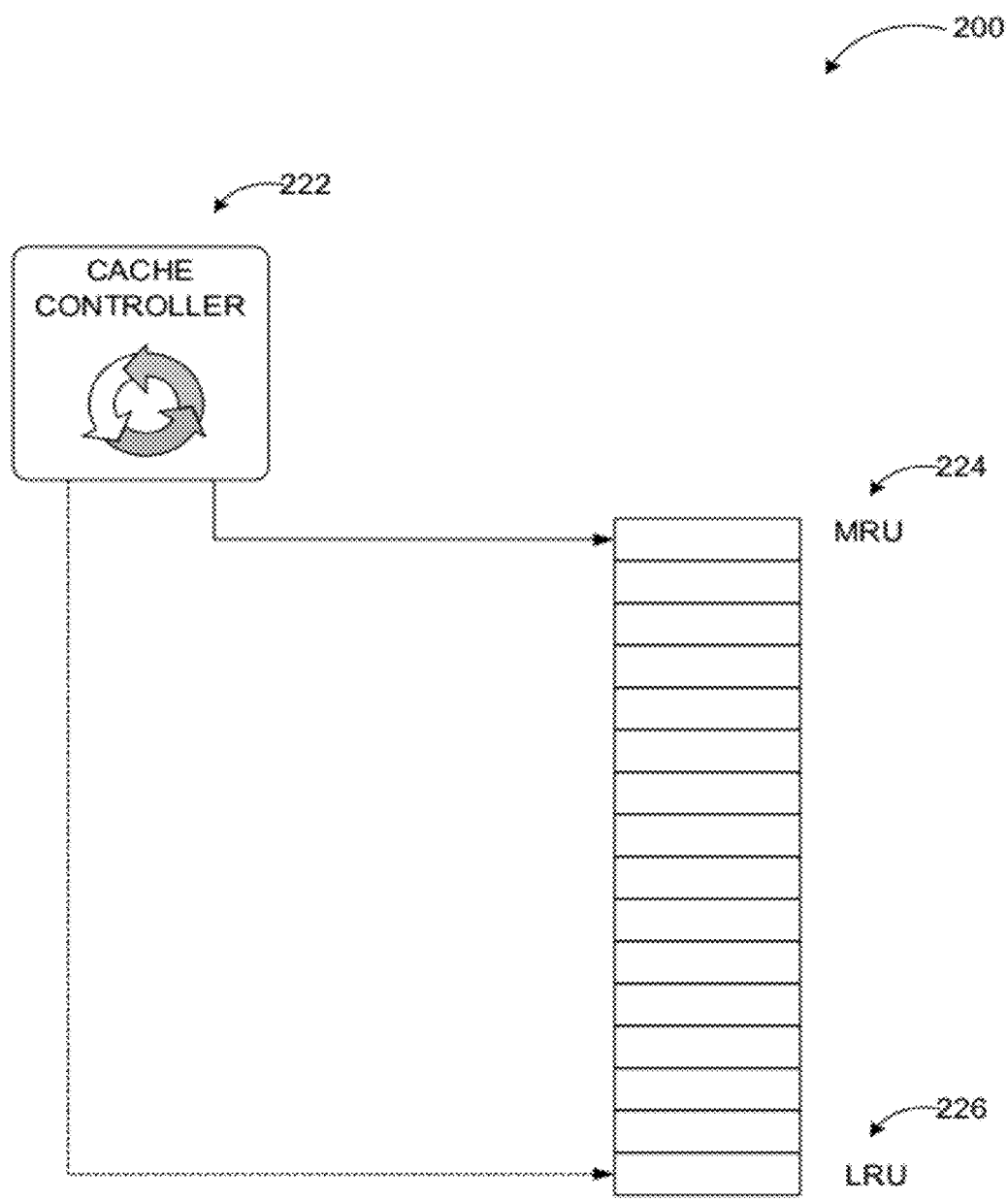
FIG. 2 illustrates Least Recently Used (LRU) and Most Recently Used (MRU) values in a cache memory controlled by a cache controller.

FIG. 2 illustrates in diagram 200 Least Recently Used (LRU) and Most Recently Used (MRU) values in a cache memory controlled by a cache controller.

Since cache memory is smaller than main memory, efficiency algorithms are employed to reduce the latency in data retrieval or calculation. Even if the data can be retrieved quickly, the cache may still be used to avoid having to re-process it. LRU replacement algorithm keeps track of memory contents that have been most heavily used in the past few instructions are most likely to be used heavily in the next few instructions too. Thus, a cache controller 222 may mark new or frequently accessed contents of the cache memory as MRU 224, while less frequently used contents progressively drop to LRU (226) status. The index of the cache memory may indicate the order of contents from LRU 226 to MRU 224.

There are a variety of LRU approaches. One commonly used method is the linked list method, which uses a linked list containing all the contents in memory. At the back of this list is the least recently used content, and at the front is the most recently used content.

Another commonly implemented LRU method uses a doubly-linked list, which drops the least recently used items out of cache when memory pressures exist. Conventional systems typically deal with single value based data, which generate and process large amounts of combination based data. In such systems, combinations of stored values are used, which can grow the amount of data to be stored exponentially causing the LRU scheme to break down. One characteristic of such combinational data is that the vast majority of the stored values (combination values) are repeated many times.

As mentioned above, lists of combination may be stored in a condensed format while still applying LRU semantics to that condensed format with efficient performance through a mapping mechanism in an LRU cache separate from a set of LRU caches for storing the values used in the combinations and a byte pointer.

Figure 3:
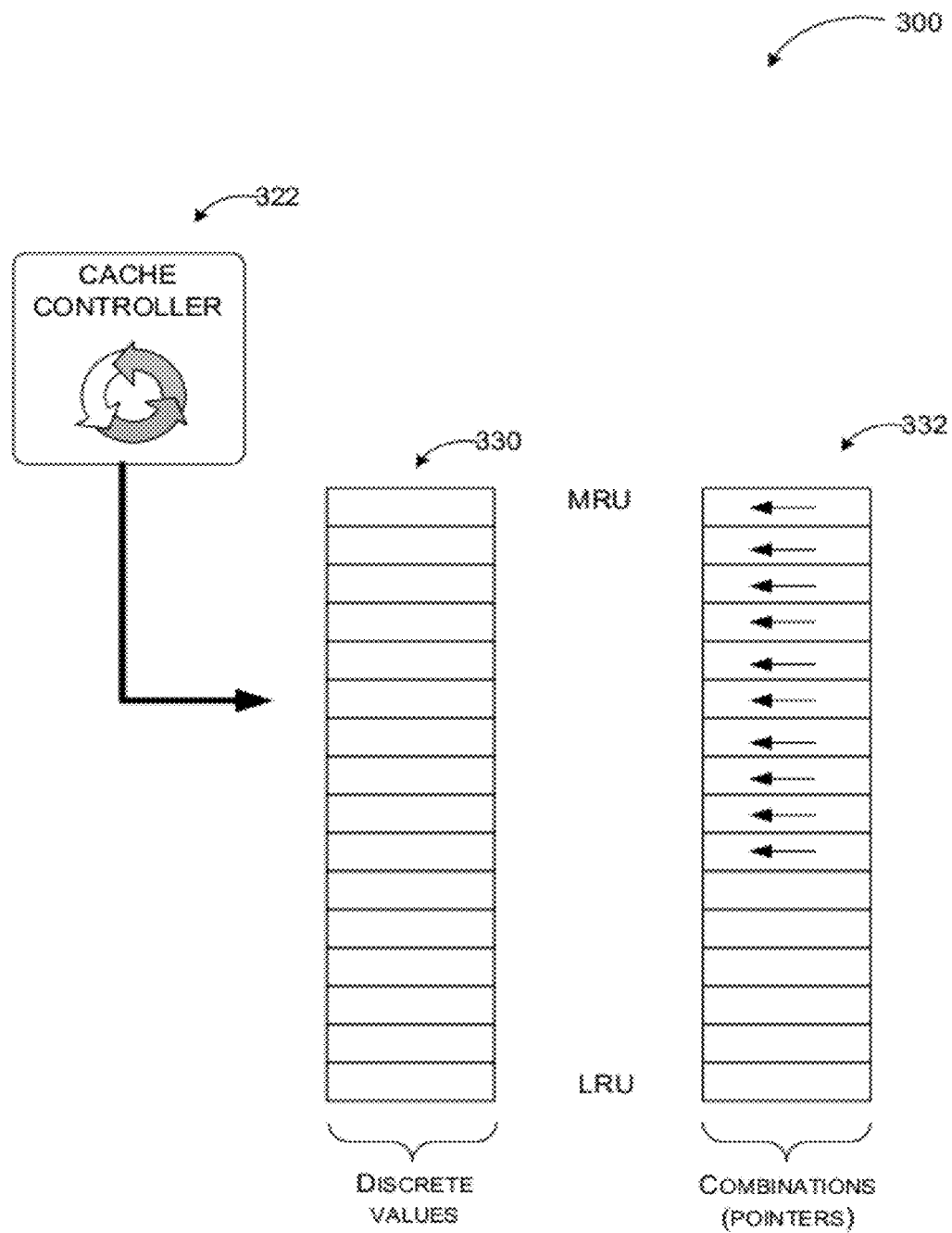
FIG. 3 illustrates a set of LRU cache memories storing discrete values and combinations in a system according to embodiments.

FIG. 3 illustrates a set of LRU cache memories storing discrete values and combinations in a system according to embodiments. According to some embodiments, two separate sets of LRU caches 330 and 332 may be utilized managed by cache controller 322. The first cache 330 may contain the discrete values for each segment. Each segment may have its own LRU cache, which tracks the most recently used values for that segment. If the cache 330 becomes full and a new value is used for that segment, the least recently used value may be dropped from cache.

The second set of LRU caches 332 may track the combinations of values from the first set of LRUs. Since the maximum size of the cache for each segment is less than 256, a pointer to the value may be stored as a byte. This means a single record in the LRU cache 332 may be a list of bytes, one for each segment. Thus, a six-segment value may be 6 bytes. The combination cache (332) may also have LRU semantics as a maximum size. Once that size is reached, the least recently used combination currently in cache may be removed if a new combination needs to be added.

The act of dropping a single segment value from LRU cache 330 may result in multiple combinations no longer being valid if they referenced that value. This means the act of removal needs to loop through all combinations and remove any that become invalid. When a combination falls out of LRU cache 332, the corresponding removal does not need to be performed on the values, as any values which are now unused quickly fall to the bottom of their respective LRU lists and are removed the next time the value store fills up. Thus, in order for the combination pointer itself to be the least recently used item, that also requires that if all values in that combination are not used in other combinations then by definition they are also all at the bottom of the discrete values list. Therefore any pre-emptive cleanup of LRU cache 330 would not yield more efficient operation in any cases.

When a new combination is added, the act of adding that combination may also require the values in the combination be added or marked as MRU if they already exist. This means that all existing combinations (pointers) referencing those values need to be updated to point to the new indexes of the values. If this affects other indexes they also need be updated. To address this, all combinations may be looped over and for each segment of each combination the existing byte value may be compared with the updated byte value (if one exists). If the byte value is greater than the old index value, it may just be directly decremented since the act of reordering may always result in items moving down exactly one position in the cache.

According to some embodiments, a set of recently used combinations may be returned without updating the fact that those combinations have been used. The use of one particular value out of that set then requires the consumer of the data to notify the cache of the combination use and updates the values. According to other embodiments, the act of retrieving a value from the cache may automatically update the fact that it has been recently used. According to an example scenario of storing 10,000 combinations across 6 segments using 7 values in each segment, this may be stored in 42 times the size of a segment value plus 60,000 bytes as pointers to the values. If a segment value is assumed to be usually around 20 bytes in size, this would require around 60 kb, a data storage savings of around 95% over storing explicit combinations which would require 1.2 mb.

The example components, data types, and interactions discussed in FIG. 1 through FIG. 3 are for illustration purposes only and do not constitute a limitation on embodiments. Combination based LRU caching may be implemented with other components, data types, and configurations using the principles described herein.

Figure 4:
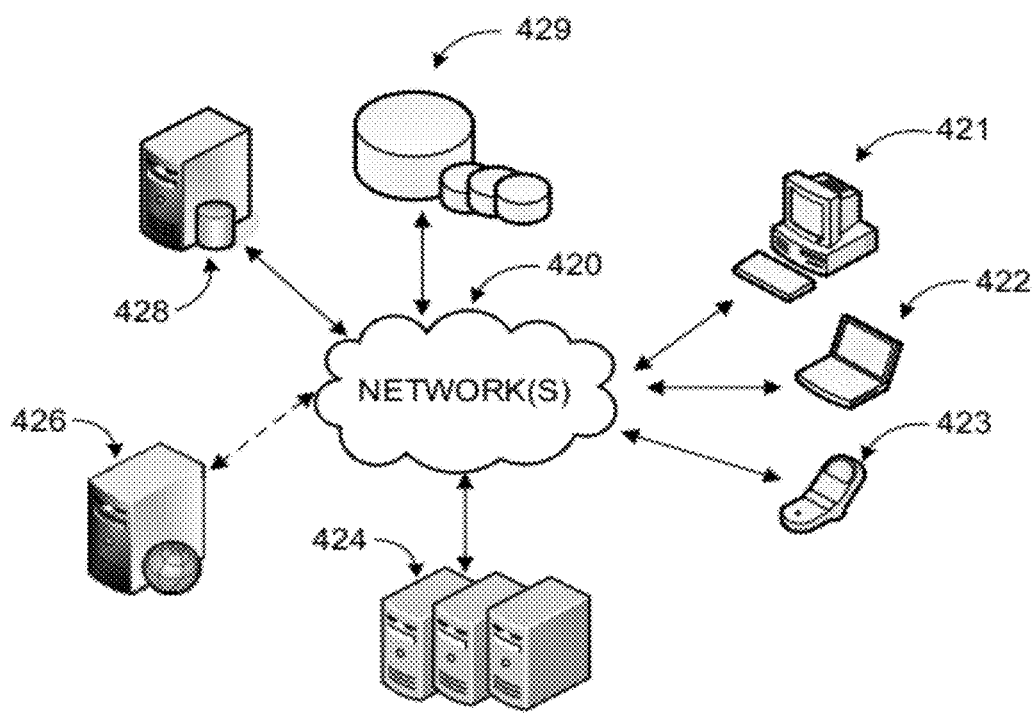
FIG. 4 is a networked environment, where a system according to embodiments may be implemented.

FIG. 4 is an example networked environment, where embodiments may be implemented. A platform providing enterprise resource planning services may generate and consume large amounts of combinational data such as combinations of accounts. Such a platform may be implemented via software executed over one or more servers 424 or a single server (e.g. web server) 426 such as a hosted service. The platform may communicate with client applications on individual computing devices such as a smart phone 423, a laptop computer 422, or desktop computer 421 ('client devices') through network(s) 420.

As discussed above, combinational data may be generated, stored in in data stores 429 directly or through database server 428. Such data may include very large amounts of combinations with repeated values. Thus, servers 424 or 426 may employ combination based LRU caching in processing the ERP based combination data enhancing an efficiency of the cache memory use, and thereby improving processing speed.

Network(s) 420 may comprise any topology of servers, clients, Internet service providers, and communication media. A system according to embodiments may have a static or dynamic topology. Network(s) 420 may include secure networks such as an enterprise network, an unsecure network such as a wireless open network, or the Internet. Network(s) 420 may also coordinate communication over other networks such as Public Switched Telephone Network (PSTN) or cellular networks. Furthermore, network(s) 420 may include short range wireless networks such as Bluetooth or similar ones. Network(s) 420 provide communication between the nodes described herein. By way of example, and not limitation, network(s) 420 may include wireless media such as acoustic, RF, infrared and other wireless media.

Many other configurations of computing devices, applications, data sources, and data distribution systems may be employed to implement combination based LRU caching. While ERP applications have been discussed as an example for generating and using combinational data, embodiments are not limited to those. A combination based LRU caching system according to embodiments may be implemented in any computing device processing combinations of stored values. Furthermore, the networked environments discussed in FIG. 4 are for illustration purposes only. Embodiments are not limited to the example applications, modules, or processes.

Figure 5:
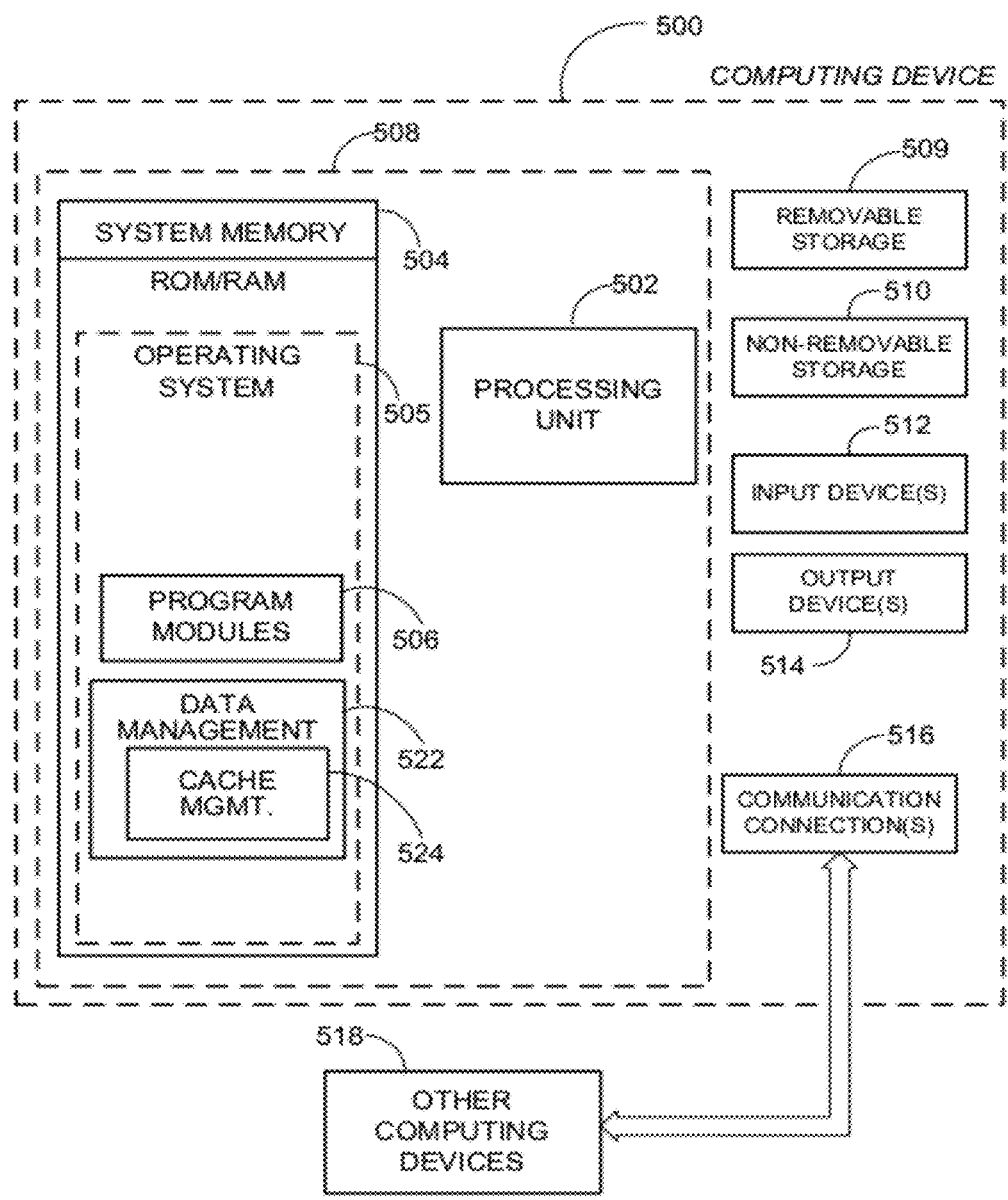
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be a server executing a data management application and include at least one processing unit 502 and system memory 504. Processing unit 502 may have its own cache memory or use a dedicated portion of system memory 504 as cache. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506, data management application 522, and cache management module 524.

A mapping mechanism in an LRU cache separate from a set of LRU caches for storing the values used in the combinations for combination based LRU caching may be employed by the cache management module 524 of data management application 522. Values and combinations may be generated and stored by data management application 522 as discussed previously. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wireless network in a distributed computing environment, a satellite link, a cellular link, and comparable mechanisms. Other devices 518 may include computer device(s) that provide data storage services, consume data, and comparable devices. Communication connection(s) 516 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 6:
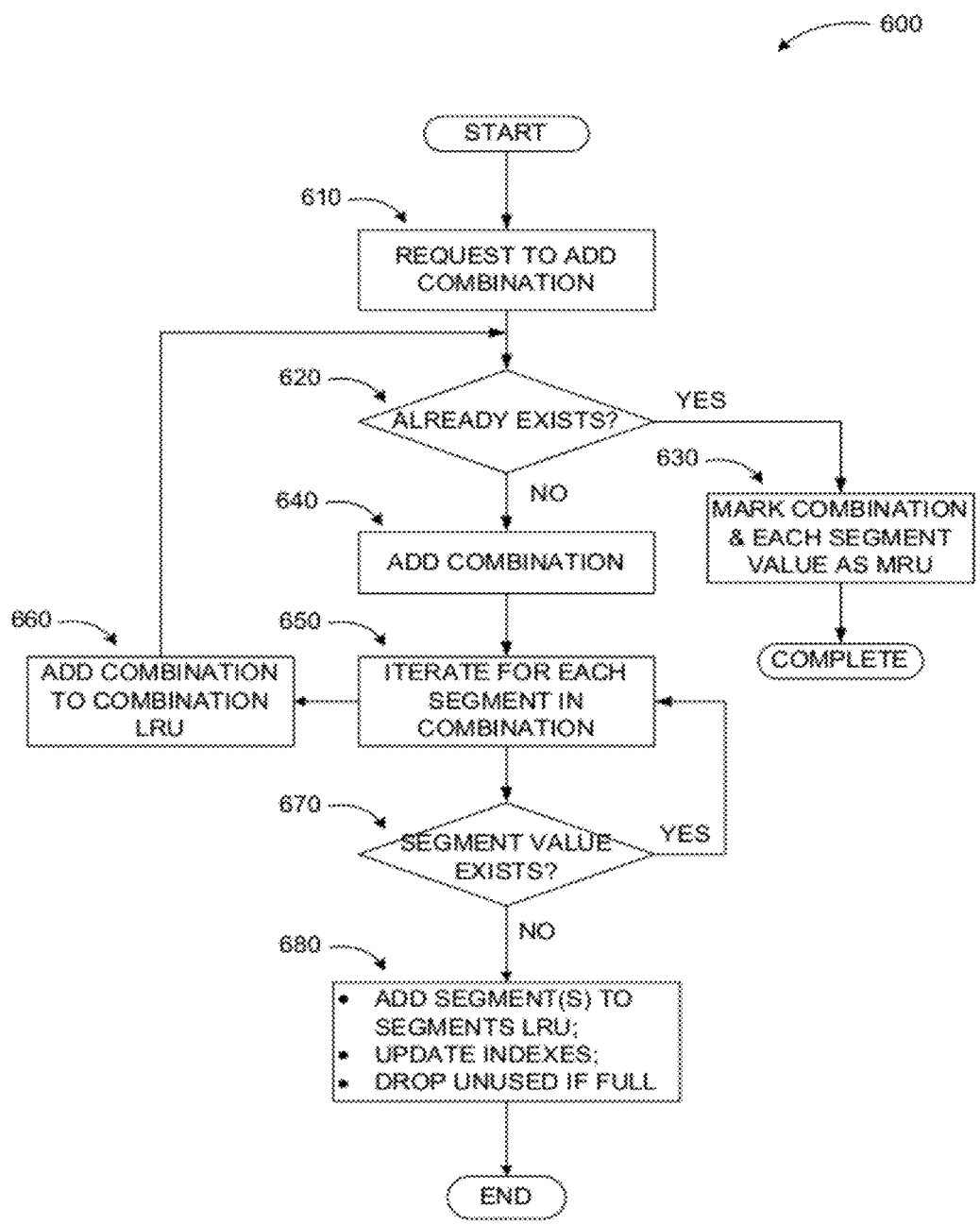
FIG. 6 illustrates a logic flow diagram for a process of employing combination based LRU cache memory according to embodiments.

FIG. 6 illustrates a logic flow diagram for process 600 employing combination based LRU cache memory according to embodiments. Process 600 may be implemented in any computing device employing cache memory for storing combinations of values.

Process 600 begins with operation 610, where a request to add a combination is received. If the combination already exists as determined at decision operation 620, the combination and each segment value of the combination are marked as MRU at operation 630 and the process is completed. If, on the other hand, the combination does not already exist, the combination may be added at operation 640 and an iterative process initiated at operation 650.

In the iterative process, for each segment value that does not exist (decision operation 670), the segments may be added to segments LRU cache(s), indexes updated, and unused segments dropped if the memory is full at operation 680. As a result of the iterative process represented by operation 650, the combination may be added to combination LRU cache at operation 660.

The operations included in process 600 are for illustration purposes. A combination based LRU cache memory system according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for providing combination based Least Recently Used (LRU) caching, the method comprising:
   storing discrete data values for each segment in a first set of LRU caches, wherein each segment is associated with a distinct LRU cache managed by a cache controller;
   employing a second set of LRU caches managed by the cache controller to track combinations of the data values stored in the first set of LRU caches;
   in response to one of the first set of LRU caches becoming full, removing a least recently used value from that cache; and
   in response to one of the second set of LRU caches becoming full, removing a least recently used combination from that cache; and
   tracking most recently used combinations of data values and notifying each set of LRU caches of the most recently used combinations.

2. The method of claim 1, wherein the combinations of values are stored as pointers to respective values in the first set of LRU caches.

3. The method of claim 2, wherein a size of a pointer for a single segment is one byte.

4. The method of claim 1, wherein each cache in the first set of LRU caches tracks most recently used values for a segment associated with that cache.

5. The method of claim 1, wherein a maximum size for each of the second set of LRU caches is determined by LRU semantics.

6. The method of claim 1, further comprising:
   in response to a single segment value being removed from one of the first set of LRU caches, iteratively processing the combinations and removing the combination that are rendered invalid based on the removed single segment value.

7. The method of claim 1, further comprising:
   in response to a combination being removed from one of the second set of LRU caches, allowing values associated with the removed combination to be removed from their respective caches in normal course of cache operations.

8. The method of claim 1, further comprising:
   in response to a new combination being added to one of the second set of LRU caches, adding values associated with the new combination to respective first set of LRU caches if the values do not already exist.

9. The method of claim 8, further comprising:
   marking the values as most recently used (MRU) if the values already exist.

10. The method of claim 9, further comprising:
    updating existing combinations in the second set of LRU caches that include at least one of the newly added and MRU marked values to point to new indexes of the newly added and MRU marked values.

11. A computing device implementing combination based Least Recently Used (LRU) caching, the computing device comprising:
    a processor that executes a cache management module, wherein the cache management module is configured to employ a cache controller to manage a first set of LRU caches for storing discrete data values for each segment of data from a data store location and a second set of LRU caches for storing pointers identifying combinations of the data values stored in the first set of LRU caches, wherein each of the LRU caches includes an index to identify a location of the data values stored in the cache, and each location of the data values includes a tag that includes the index of the data values that have been cached, and wherein
    a least recently used value is removed from one of the first set of LRU caches in response to that cache becoming full; and
    a least recently used combination of values is removed from one of the second set of LRU caches in response to that cache becoming full.

12. The computing device of claim 11, wherein the pointers are stored in the second set of LRU caches as byte values.

13. The computing device of claim 12, wherein in response to a new combination being added to one of the second set of LRU caches, an existing byte value is compared with an updated byte value for each segment of each combination and the updated byte value is decremented if the updated byte value is greater than the existing byte value.

14. The computing device of claim 11, wherein a set of recently used combinations is returned without updating a status of the set of recently used combinations as having been most recently used (MRU).

15. The computing device of claim 14, wherein byte values of the combinations without updated status are marked as MRU by a process consuming a value associated with the combinations in response consumption of the value.

16. The computing device of claim 11, wherein a value retrieved from a respective cache automatically marked as having been recently used.

17. The computing device of claim 11, wherein a value and combinations associated with the value are marked as MRU in response to one of the value being read from its cache location and a new value being written to the value's cache location.

* * * * *